US012482349B2

(12) United States Patent
Tseng et al.

(10) Patent No.: US 12,482,349 B2
(45) Date of Patent: Nov. 25, 2025

(54) DRIVING ASSISTANCE SYSTEM AND DRIVING ASSISTANCE METHOD

(71) Applicant: PEGATRON CORPORATION, Taipei (TW)

(72) Inventors: Yu-Hung Tseng, Taipei (TW); Ping-Yao Wu, Taipei (TW); Chia-Wei Chen, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 169 days.

(21) Appl. No.: 18/307,601

(22) Filed: Apr. 26, 2023

(65) Prior Publication Data

US 2023/0386325 A1 Nov. 30, 2023

(30) Foreign Application Priority Data

May 26, 2022 (TW) ................................. 111119618

(51) Int. Cl.

*G08G 1/01* (2006.01)
*G08G 1/04* (2006.01)
*G08G 1/0967* (2006.01)

(52) U.S. Cl.

CPC ......... *G08G 1/0116* (2013.01); *G08G 1/0145* (2013.01); *G08G 1/04* (2013.01); *G08G 1/096725* (2013.01)

(58) Field of Classification Search

CPC ...... G08G 1/0116; G08G 1/0145; G08G 1/04; G08G 1/096725
USPC .......................................................... 701/117
See application file for complete search history.

(56) References Cited

U.S. PATENT DOCUMENTS 4,320,380 A * 3/1982 Berard .................... E01F 13/06 49/49
10,832,571 B2 * 11/2020 Yamada ............... G08G 1/0112
11,398,150 B2 * 7/2022 Young .................. G08G 1/0141
11,807,238 B2 * 11/2023 Dobi ...................... G06V 20/58
2007/0233386 A1 * 10/2007 Saito ...................... G08G 1/165 701/117
2014/0278052 A1 9/2014 Slavin et al.

(Continued)

FOREIGN PATENT DOCUMENTS

CN 102136195 7/2011
CN 109670376 4/2019

(Continued)

OTHER PUBLICATIONS

"Search Report of Europe Counterpart Application", issued on Sep. 28, 2023, p. 1-p. 14.

(Continued)

*Primary Examiner* — Luis A Martinez Borrero
(74) *Attorney, Agent, or Firm* — J.C. PATENTS

(57) ABSTRACT

A driving assistance system and a driving assistance method are provided. The driving assistance system includes a plurality of image capturing devices, a congestion calculation module, and a determination module. The image capturing devices capture a plurality of regional images of a plurality of road sections of the target lane. The congestion calculation module calculates a plurality of congestion levels corresponding to the road sections according to the regional images. The determination module provides a lane changing message to the vehicle according to the congestion levels.

11 Claims, 3 Drawing Sheets

(56) References Cited

U.S. PATENT DOCUMENTS

| | | | | |
|---|---|---|---|---|
| 2014/0358413 | A1* | 12/2014 | Trombley | G08G 1/0112 701/118 |
| 2017/0200371 | A1* | 7/2017 | Glander | G08G 1/165 |
| 2017/0341653 | A1 | 11/2017 | Kubota et al. | |
| 2017/0371349 | A1* | 12/2017 | Kim | G08G 1/096775 |
| 2018/0251155 | A1* | 9/2018 | Chan | G08G 1/0125 |
| 2019/0156664 | A1* | 5/2019 | Yamada | G08G 1/0129 |
| 2019/0279502 | A1* | 9/2019 | Fowe | G08G 1/0112 |
| 2019/0329768 | A1* | 10/2019 | Shalev-Shwartz | G05D 1/65 |
| 2020/0242922 | A1* | 7/2020 | Dulberg | G08G 1/166 |
| 2021/0035443 | A1* | 2/2021 | Young | G08G 1/0145 |
| 2021/0118294 | A1* | 4/2021 | Ran | G08G 1/04 |
| 2021/0213951 | A1* | 7/2021 | Dobi | G08G 1/0133 |
| 2021/0319691 | A1* | 10/2021 | Merwaday | G08G 1/0116 |
| 2022/0215747 | A1* | 7/2022 | Tan | G08G 1/0116 |
| 2023/0005364 | A1* | 1/2023 | Walter | B60W 30/0956 |

FOREIGN PATENT DOCUMENTS

| | | |
|---|---|---|
| CN | 111598069 | 8/2020 |
| JP | 2015207211 | 11/2015 |
| JP | 2020016509 | 1/2020 |
| WO | 2017187882 | 11/2017 |

OTHER PUBLICATIONS

"Office Action of Europe Counterpart Application", issued on Jan. 16, 2025, p. 1-p. 7.

* cited by examiner

DRIVING ASSISTANCE SYSTEM AND DRIVING ASSISTANCE METHOD

CROSS-REFERENCE TO RELATED APPLICATION

This application claims the priority benefit of Taiwan application serial no. 111119618, filed on May 26, 2022. The entirety of the above-mentioned patent application is hereby incorporated by reference herein and made a part of this specification.

BACKGROUND

Technology Field

The disclosure relates to a driving assistance system and a driving assistance method, and particularly relates to a driving assistance system and a driving assistance method for navigating a vehicle according to actual road conditions.

Description of Related Art

Current driving assistance systems for vehicles may be divided into semi-automatic driving systems (for example, level 2, level 3 driving systems) and automatic driving systems (for example, a level 4 driving system). Regarding the semi-automatic driving system, when the vehicle changes to a target lane, a driver still needs to visually observe a congestion situation of the target lane to determine whether the vehicle may be switched from a current lane to the target lane.

The automatic driving system may control the self-driving vehicle to drive from the current lane to the target lane by itself. However, the automatic driving system may not be able to control the self-driving vehicle to change lanes smoothly because the target lane is too congested, thus missing the originally planned short route and leading to re-plan a longer route.

It may be seen that regardless of the type of the driving assistance system, the congestion condition of the target lane will affect a lane changing result of the vehicle. Thus, how to provide a message to instruct the vehicle to change from the current lane to the target lane as early as possible according to the congestion condition of the target lane is one of the research focuses of those skilled in the art.

SUMMARY

The disclosure is directed to a driving assistance system and a driving assistance method for navigating a vehicle according to a congestion condition of a target lane.

The disclosure provides a driving assistance system for navigating a vehicle. The driving assistance system includes multiple image capturing devices, a congestion calculation module and a determination module. The image capturing devices capture multiple regional images of multiple road sections of a target lane. The congestion calculation module receives the regional images from the image capturing devices, and calculates multiple congestion levels corresponding to the road sections according to the regional images. The determination module receives the congestion levels from the congestion calculation module and provides a lane changing message to the vehicle according to the congestion levels.

The disclosure provides a driving assistance method for navigating a vehicle. The driving assistance method includes: capturing multiple regional images of multiple road sections of a target lane by multiple image capturing devices; calculating multiple congestion levels corresponding to the road sections according to the regional images; and providing a lane changing message to the vehicle according to the congestion levels.

Based on the above description, the driving assistance system and the driving assistance method of the disclosure calculate multiple congestion levels corresponding to the road sections according to the regional images and provide the lane changing message to the vehicle according to the congestion levels. In this way, according to the lane changing message, the vehicle is adapted to be driven from the current lane to the target lane on a road section with less serious congestion.

To make the aforementioned more comprehensible, several embodiments accompanied with drawings are described in detail as follows.

DESCRIPTION OF THE EMBODIMENTS

Figure 1:
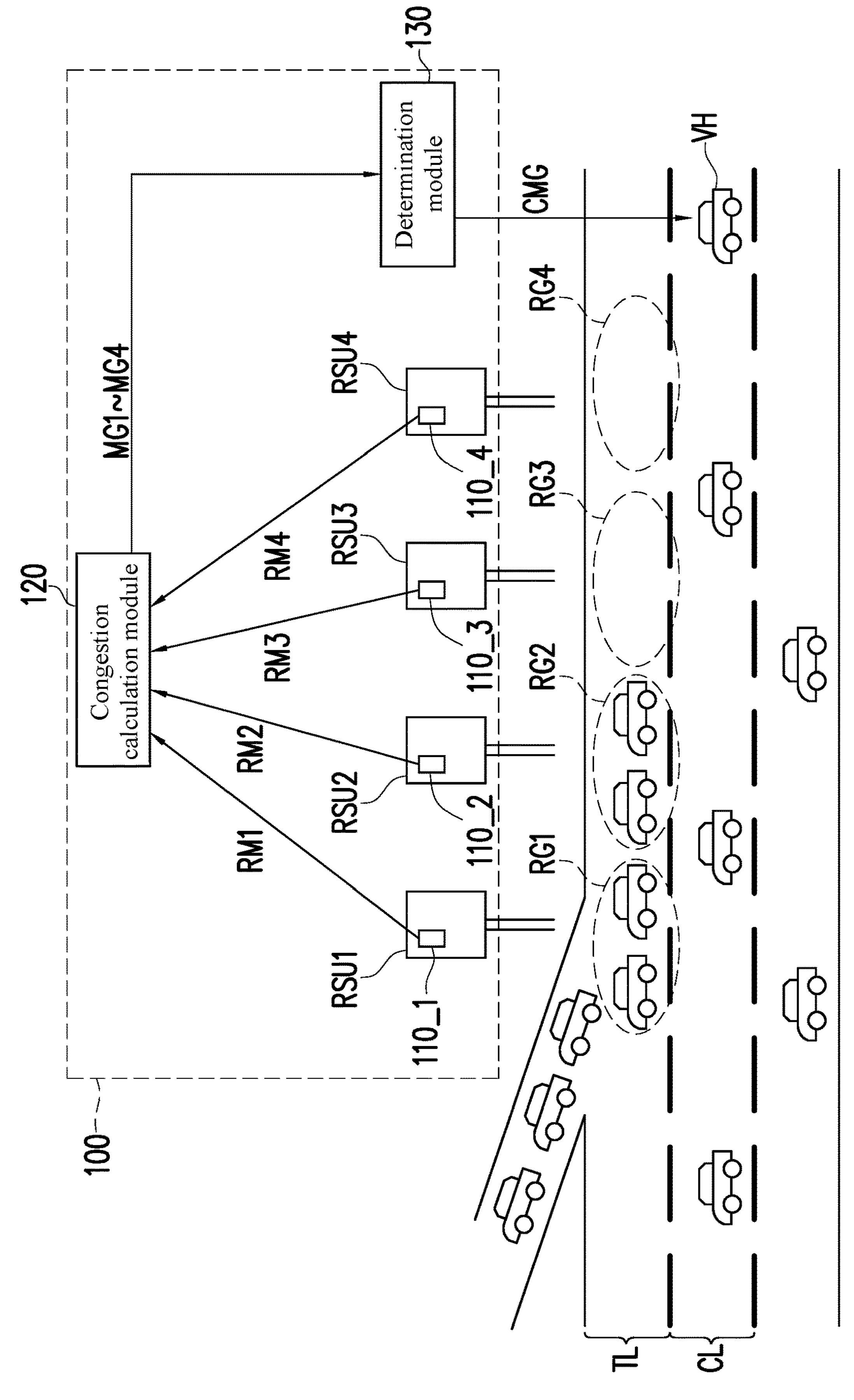
FIG. 1 is a schematic diagram of an operational scenario of a driving assistance system according to an embodiment of the disclosure.

Referring to FIG. 1, FIG. 1 is a schematic diagram of an operational scenario of a driving assistance system according to an embodiment of the disclosure. In the embodiment, a driving assistance system 100 is used for navigating a vehicle VH. The driving assistance system 100 includes image capturing devices 110_1-110_4, a congestion calculation module 120 and a determination module 130. The image capturing devices 110_1-110_4 capture regional images RM1-RM4 of road sections RG1-RG4 of a target lane TL. For example, the target lane TL is an exit lane of an expressway or a highway. The image capture device 110_1 is installed at various roadside locations. A distance between one and another roadside location is tens to hundreds meters. For example, the image capturing device 110_1 captures the regional image RM1 of the road section RG1, the image capturing device 110_2 captures the regional image RM2 of the road section RG2, the image capturing device 110_3 captures the regional image RM3 of the road section RG3, and the image capturing device 110_4 captures the regional image RM4 of the road section RG4.

In the embodiment, the congestion calculation module 120 communicates with the image capturing devices 110_1-110_4 to receive the regional images RM1-RM4 from the image capturing devices 110_1-110_4. The congestion calculation module 120 calculates congestion levels MG1-MG4 corresponding to the road sections RG1-RG4 according to the regional images RM1-RM4. The determination module 130 communicates with the congestion calculation module 120 to receive the congestion levels MG1-MG4 from the congestion calculation module 120. The determination module 130 provides a lane changing message CMG to the vehicle VH according to the congestion levels MG1-MG4.

It should be noted that the driving assistance system 100 receives the regional images RM1-RM4 of the road sections RG1-RG4 of the target lane TL. The driving assistance system 100 calculates the congestion levels MG1-MG4 corresponding to the road sections RG1-RG4 according to the regional images RM1-RM4 and provides the lane changing message CMG to the vehicle VH according to the congestion levels MG1-MG4. Namely, the lane changing message CMG received by the vehicle VH is related to actual congestion conditions of the road sections RG1-RG4 of the target lane TL. The driving assistance system 100 may provide the lane changing message CMG to the vehicle VH according to the congestion conditions of the target lane TL, so that the vehicle VH may be driven from a current lane CL to the target lane TL as early as possible. In this way, based on the lane changing message CMG, the vehicle VH may travel from the current lane CL to the target lane TL on a road section with less serious congestion, thereby improving driving safety.

Taking the embodiment as an example, the congestion calculation module 120 calculates the congestion level MG1 corresponding to the road section RG1 according to the regional image RM1; the congestion calculation module 120 calculates the congestion level MG2 corresponding to the road section RG2 according to the regional image RM2; and the congestion calculation module 120 calculates the congestion level MG3 corresponding to the road section RG3 according to the regional image RM3. In addition, the congestion calculation module 120 further calculates the congestion level MG4 corresponding to the road section RG4 according to the regional image RM4. In the embodiment of the disclosure, the road sections RG1 and RG2 are congested with traffic while road sections RG3 and RG4 are not congested with traffic. The determination module 130 provides the lane changing message CMG to the vehicle VH in response to the congestion levels MG1-MG4. Thus, the vehicle VH may travel from the current lane CL to the target lane TL on one of the road sections RG3 and RG4 as early as possible according to the lane changing message CMG.

In the embodiment, the image capturing devices 110_1-110_4 may be installed at respective roadside facilities (RSU) RSU1-RSU4. For example, the image capturing device 110_1 is installed at the roadside facility RSU1; the image capturing device 110_2 is installed at the roadside facility RSU2, and so on. The roadside facilities RSU1-RSU4 are, for example, street lamps, traffic lights, arbitrary road signs and traffic signals installed on the road side. The image capturing devices 110_1-110_4 are, for example, implemented by cameras or video cameras.

In the embodiment, the driving assistance system 100 is exemplified by four image capturing devices 110_1-110_4. However, the number of the image capturing devices of the disclosure is not limited to the embodiment. The number of the image capturing devices of the disclosure may be plural. The number of the image capturing devices of the disclosure may be designed based on practical usage requirements.

In the embodiment, the congestion calculation module 120 may be arranged outside the roadside facilities and the determination module 130. The congestion calculation module 120 and the determination module 130 include, for example, at least one central processing unit (CPU), or at least one programmable general-purpose or special-purpose microprocessor, at least one digital signal processor (DSP), at least one programmable controller, at least one application specific integrated circuit (ASIC), at least one programmable logic device (PLD) or other similar devices or a combination of these devices, which may load and execute computer programs.

In some embodiments, the congestion calculation module 120 may be a first server or a first host. The determination module 130 may be a second server or a second host.

In some embodiments, the congestion calculation module 120 may be disposed inside at least one of the roadside facilities RSU1-RSU4.

Figure 2:
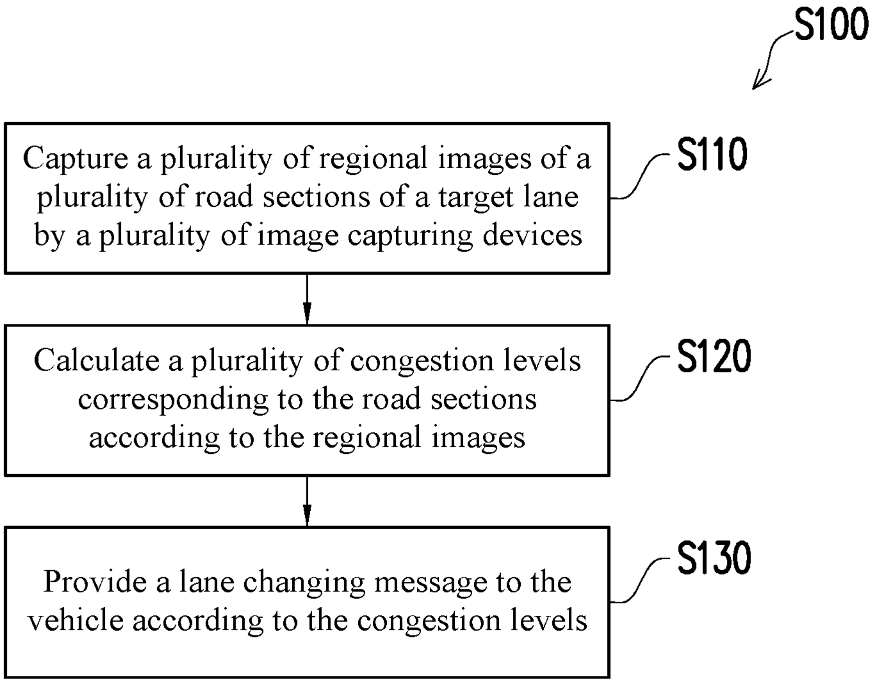
FIG. 2 is a flowchart of a driving assistance method according to an embodiment of the disclosure.

Referring to FIG. 1 and FIG. 2 together, FIG. 2 is a flowchart of a driving assistance method according to an embodiment of the disclosure. In the embodiment, a driving assistance method S100 is used for navigating the vehicle VH. The driving assistance method S100 is adapted to the driving assistance system 100. The driving assistance method S100 includes steps S110-S130. In step S110, the image capturing devices 110_1-110_4 capture the regional images RM1-RM4 of the road sections RG1-RG4 of the target lane TL. In step S120, the congestion levels MG1-MG4 corresponding to the road sections RG1-RG4 are calculated according to the regional images RM1-RM4. In step S130, the lane changing message CMG is provided to the vehicle VH according to the congestion levels MG1-MG4. In the embodiment, regarding implementation details of steps S110-S130, sufficient teachings may be learned from the embodiment of FIG. 1, so that details thereof are not repeated.

Figure 3:
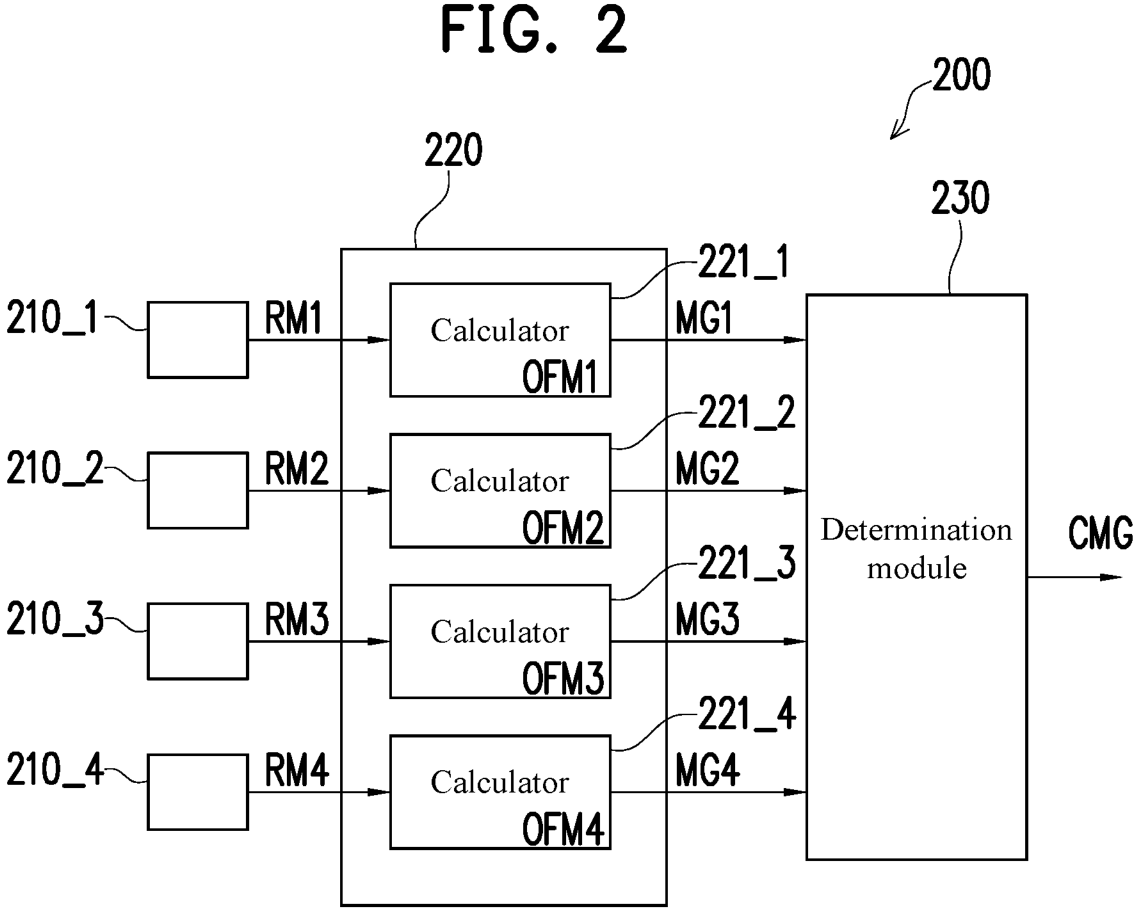
FIG. 3 is a schematic diagram of a driving assistance system according to an embodiment of the disclosure.

Referring to FIG. 1 and FIG. 3 together, FIG. 3 is a schematic diagram of a driving assistance system according to an embodiment of the disclosure. In the embodiment, a driving assistance system 200 includes image capturing devices 210_1-210_4, a congestion calculation module 220 and a determination module 230. The image capturing devices 210_1-210_4 capture the regional images RM1-RM4 of the road sections RG1-RG4 of the target lane TL. The configuration method and implementation details of the image capturing devices 210_1-210_4 are similar to the configuration method and implementation details of the image capturing devices 110_1-110_4 in FIG. 1, and details thereof are not repeated here.

In the embodiment, the congestion calculation module 220 generates optical flow information OFM1-OFM4 according to the regional images RM1-RM4. The optical flow information OFM1 corresponds to the regional image RM1; the optical flow information OFM2 corresponds to the regional image RM2; the optical flow information OFM3 corresponds to the regional image RM3; the optical flow information OFM4 corresponds to the regional image RM4. The congestion calculation module 220 calculates the congestion levels MG1-MG4 according to the regional images RM1-RM4 and the optical flow information OFM1-OFM4.

In the embodiment, the congestion calculation module 220 includes calculators 221_1-221_4. The calculators 221_1-221_4 are coupled to the image capturing devices 210_1-210_4, respectively. Taking the embodiment as an example, the calculator 221_1 is coupled to the image capturing device 210_1; the calculator 221_2 is coupled to the image capturing device 210_2, and so on. The calculator 221_1 receives the regional image RM1, generates the optical flow information OFM1 according to the regional image RM1, and calculates the congestion level MG1 according to the regional image RM1 and the optical flow information OFM1; the calculator 221_2 receives the regional image RM2, generates the optical flow information OFM2 according to the regional image RM2, and calculates the congestion level MG2 according to the regional image RM2 and the optical flow information OFM2, and so on.

The calculator 221_1 determines the number of vehicles on the road section RG1 of the target lane TL according to a texture of the regional image RM1 and determines a traffic speed on the road section RG1 of the target lane TL according to the optical flow information OFM1. The calculator 221_1 also calculates a congestion value of the congestion level MG1 according to complexity of the texture of the regional image RM1 and an optical flux of the optical flow information OFM1. The calculator 221_2 determines the number of vehicles on the road section RG2 of the target lane TL according to a texture of the regional image RM2 and determines a traffic speed on the road section RG2 of the target lane TL according to the optical flow information OFM2. The calculator 221_2 also calculates a congestion value of the congestion level MG2 according to complexity of the texture of the regional image RM2 and an optical flux of the optical flow information OFM2, and so on.

The complexities of the textures of the road sections RG1-RG4 are positively correlated with the number of vehicles on the corresponding road sections of the target lane TL. The optical flux is positively correlated with the traffic speed on the corresponding road section of the target lane TL. Thus, the higher the complexity of the texture and the lower the optical flux are, the higher the corresponding congestion level is. On the other hand, the lower the complexity of the texture and the higher the optical flux are, the lower the corresponding congestion level is.

Figure 4:
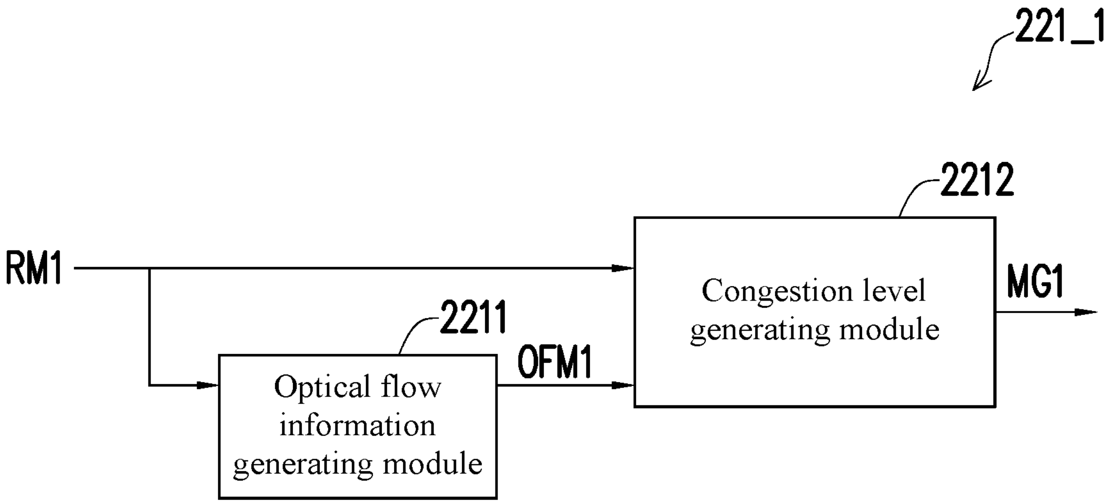
FIG. 4 is a schematic diagram of a calculator according to an embodiment of the disclosure.

For further description, referring to FIG. 3 and FIG. 4 together, FIG. 4 is a schematic diagram of a calculator according to an embodiment of the disclosure. In the embodiment, the calculator 221_1 includes an optical flow information generating module 2211 and a congestion level generating module 2212. The optical flow information generating module 2211 receives the regional image RM1, and calculates the optical flow information OFM1 according to the regional image RM1.

For example, the optical flow information generating module 2211 may capture multiple latest frames of the regional image RM1 (for example, the latest 90 frames in the regional image RM1, which is not limited by the disclosure). The optical flow information generating module 2211 uses the multiple frames to calculate the optical flow information OFM1 corresponding to the multiple frames. The optical flow information generating module may be a conversion circuit or software for converting the regional image RM1 into the optical flow information OFM1.

The congestion level generating module 2212 is coupled to the optical flow information generating module 2211. The congestion level generating module 2212 receives the regional image RM1 and the optical flow information OFM1. The congestion level generating module 2212 includes, for example, a deep learning model or a neural network. The deep learning model is, for example, a classification model (such as AlextNet, Googlenet, Resnet, Mobilenet, etc.) or an object detection model (such as Mask RCNN, SSD, Yolo4, Yolo5, etc.).

The congestion level generating module 2212 captures the texture of the regional image RM1 to identify the number of vehicles on the road section RG1 of the target lane TL. The texture of the regional image RM1 is associated with outlines and colours of the vehicles on the road section RG1. Thus, the simpler the texture of the regional image RM1 is, the less vehicles are determined on the road section RG1 by the congestion level generating module 2212. The more complex the texture of the regional image RM1 is, the more vehicles are determined on the road section RG1 by the congestion level generating module 2212.

The optical flux of the optical flow information OFM1 is associated with moving speeds of the vehicles on the road section RG1. Thus, the smaller the optical flux of the optical flow information OFM1 is, the slower the traffic speed on the road section RG1 is determined by the congestion level generating module 2212. The greater the optical flux of the optical flow information OFM1 is, the faster the traffic speed on the road section RG1 is determined by the congestion level generating module 2212. In detail, the congestion level generating module 2212 calculates the congestion value associated with the congestion level MG1 of the road section RG1 according to the complexity of the texture and the optical flux of the optical flow information OFM1. The congestion value is, for example, a percentage value (for example, 0%-100%). The greater the congestion value is, the more severe the congestion level on the road section RG1 is.

In an embodiment, the congestion level generating module 2212 may extract multiple features of the regional image RM1 and the optical flow information OFM1 through a convolution network, feed the multiple features into the Fully Connected Layer for classification, and perform Loss Function operation to obtain the congestion value.

Referring back to the embodiment shown in FIG. 1 and FIG. 3, taking the calculator 221_1 as an example, the calculator 221_1 and the image capturing device 210_1 may be set in the roadside facility RSU1. In some embodiments, the calculator 221_1 may be disposed in the image capturing device 210_1.

In the embodiment, the determination module 230 receives the congestion levels MG1-MG4. The determination module 230 provides the lane changing message CMG according to multiple congestion values of the congestion levels MG1-MG4. The determination module 230 may identify current congestion levels of the road sections RG1-RG4 according to the congestion values of the congestion levels MG1-MG4 and provide the lane changing message CMG accordingly. The determination module 230 determines the congestion values of the congestion levels MG1-MG4 based on a threshold. For example, the threshold is set at 40%. The congestion value of the congestion level MG1 is 90%. The congestion value of the congestion level MG2 is 85%. The congestion value of the congestion level MG3 is 10%. The congestion value of the congestion level MG4 is 10%. The congestion values of the congestion levels MG1 and MG2 are both higher than the threshold. The congestion values of the congestion levels MG3 and MG4 are both lower than the threshold. Thus, the lane changing message CMG provided by the determination module 230 may inform the vehicle VH of switching to the target lane TL on the road sections RG3 and RG4.

In some embodiments, the determination module 230 also determines a designated non-congested road section that is closest to a congested road section for the vehicle VH based on the congestion levels MG1-MG4, and notifies the vehicle VH of switching to the target lane TL at the designated non-congested road section. For example, the congestion values of the congestion levels MG1 and MG2 are both higher than the threshold. The congestion values of the congestion levels MG3 and MG4 are both lower than the threshold. Thus, the determination module 230 determines that the road sections RG1, RG2 are congested road sections, and the road sections RG3, RG4 are non-congested road sections. The determination module 230 designate the road section RG3 as a non-congested road section, and notify the vehicle VH of switching to the target lane TL on the road section RG3.

The determination module 230 includes, for example, a deep learning model or a neural network. The deep learning model is, for example, a classification model (such as AlextNet, Googlenet, Resnet, Mobilenet, etc.) or an object detection model (such as Mask RCNN, SSD, Yolo4, Yolo5, etc.).

It should be noted that the driving assistance systems 100 and 200 may be adapted to lane changing decisions supporting driving navigation software, Level 2 driving assistance systems, Level 3 semi-automatic driving systems, and self-driving systems. The driving assistance systems 100 and 200 notify the vehicle VH of switching to the target lane TL on a non-congested road section through the lane changing message CMG according to the actual congestion situation on the road sections RG1-RG4 of the target lane TL. In this way, the vehicle VH does not miss an original driving route.

In summary, the driving assistance system and the driving assistance method of the disclosure calculate multiple congestion levels corresponding to the road sections according to the regional images and provide the lane changing message to the vehicle according to the congestion levels. According to the lane changing message, the vehicle may travel from the current lane to the target lane on a road section with less serious congestion. In this way, the vehicle does not miss the original driving route due to the congestion of the road section.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. A driving assistance system for navigating a vehicle comprising:

a plurality of cameras, configured to capture a plurality of regional images of a plurality of road sections of a target lane, wherein the target lane is an exit lane of an expressway or a highway;

a congestion calculation processor, configured to receive the regional images from the cameras and calculate a plurality of congestion levels corresponding to the road sections according to the regional images; and a determination processor, configured to receive the congestion levels from the congestion calculation processor and provide a lane changing message to the vehicle according to the congestion levels, wherein the congestion calculation processor comprises a plurality of calculators, coupled to the respective cameras, wherein each of the calculators generates a corresponding optical flow information according to a corresponding regional image among the regional images and calculates a corresponding congestion level according to the corresponding regional image and the corresponding optical flow information, and wherein each of the calculators determines the number of vehicles on a corresponding road section of the target lane according to a texture of the corresponding regional image, determines a traffic speed on the corresponding road section of the target lane according to the corresponding optical flow information, and calculates a congestion value of the corresponding congestion level according to complexity of the texture and an optical flux of the corresponding optical flow information.

2. The driving assistance system according to claim 1, wherein the cameras are disposed at a plurality of different roadside facilities.

3. The driving assistance system according to claim 1, wherein the congestion calculation processor generates a plurality of optical flow information corresponding to the regional images and calculates the congestion levels according to the regional images and the optical flow information.

4. The driving assistance system according to claim 1, wherein the complexity of the texture is positively correlated with the number of vehicles on the corresponding road section of the target lane, and the optical flux is positively correlated with the traffic speed on the corresponding road section of the target lane.

5. The driving assistance system according to claim 4, wherein the higher the complexity of the texture and the lower the optical flux are, the higher the congestion value gets.

6. The driving assistance system according to claim 1, wherein in response to at least one congestion value of the congestion values lower than a threshold, the determination processor provides the lane changing message to notify the vehicle of switching to the target lane on the road section corresponding to the at least one congestion value.

7. A driving assistance method for navigating a vehicle and comprising:

capturing a plurality of regional images of a plurality of road sections of a target lane by a plurality of cameras, wherein the target lane is an exit lane of an expressway or a highway;

calculating a plurality of congestion levels corresponding to the road sections according to the regional images; and providing a lane changing message to the vehicle according to the congestion levels, wherein a congestion calculation processor comprises a plurality of calculators, wherein each of the calculators is coupled to a corresponding image capturing device among the cameras, and wherein the step of calculating the congestion levels corresponding to the road sections according to the regional images comprises:

generating a corresponding optical flow information according to a corresponding regional image among the regional images by each of the calculators, and calculating a corresponding congestion level according to the corresponding regional image and the corresponding optical flow information, and wherein the step of calculating the corresponding congestion level according to the corresponding regional image and the corresponding optical flow information comprises:

determining the number of vehicles on a corresponding road section of the target lane according to a texture of the corresponding regional image;

determining a traffic speed on the corresponding road section of the target lane according to the corresponding optical flow information; and calculating a congestion value of the corresponding congestion level according to complexity of the texture and an optical flux of the corresponding optical flow information.

8. The driving assistance method according to claim 7, wherein the step of calculating the congestion levels corresponding to the road sections according to the regional images comprises:

generating a plurality of optical flow information corresponding to the regional images according to the regional images; and calculating the congestion levels according to the regional images and the optical flow information.

9. The driving assistance method according to claim 7, wherein the complexity of the texture is positively correlated with the number of vehicles on the corresponding road section of the target lane, and the optical flux is positively correlated with the traffic speed on the corresponding road section of the target lane.

10. The driving assistance method according to claim 9, wherein the higher the complexity of the texture and the lower the optical flux are, the higher the congestion value gets.

11. The driving assistance method according to claim 7, wherein the step of providing the lane changing message to the vehicle according to the congestion levels comprises:

in response to at least one congestion value of the congestion values lower than a threshold, providing the lane changing message to notify the vehicle of switching to the target lane on the road section corresponding to the at least one congestion value.

* * * * *